US009612371B2

(12) United States Patent
Lin et al.

(10) Patent No.: US 9,612,371 B2
(45) Date of Patent: Apr. 4, 2017

(54) SLIT GRATING AND ITS MANUFACTURING METHOD, GRATING STRUCTURE AND DISPLAY DEVICE

(71) Applicant: BOE TECHNOLOGY GROUP CO., LTD., Beijing (CN)

(72) Inventors: Chiachiang Lin, Beijing (CN); Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/435,103

(22) PCT Filed: Mar. 18, 2014

(86) PCT No.: PCT/CN2014/073622
§ 371 (c)(1),
(2) Date: Apr. 10, 2015

(87) PCT Pub. No.: WO2015/123904
PCT Pub. Date: Aug. 27, 2015

(65) Prior Publication Data
US 2015/0346401 A1    Dec. 3, 2015

(30) Foreign Application Priority Data
Feb. 24, 2014    (CN) .......................... 2014 1 0062464

(51) Int. Cl.
G02F 1/03    (2006.01)
G02B 5/18    (2006.01)
(Continued)

(52) U.S. Cl.
CPC ......... G02B 5/1842 (2013.01); G02B 5/1866 (2013.01); G02B 5/208 (2013.01);
(Continued)

(58) Field of Classification Search
CPC .... G02F 1/155; G02F 1/157; G02F 1/133553; G02F 2001/1555; B60R 1/088;
(Continued)

(56) References Cited

U.S. PATENT DOCUMENTS 5,991,072 A * 11/1999 Solyntjes ............... G02B 5/208
2/8.7
6,124,920 A    9/2000 Moseley et al.
(Continued)

FOREIGN PATENT DOCUMENTS

CN    1924639 A    3/2007
CN    102081238 A    6/2011
(Continued)

OTHER PUBLICATIONS

First Office Action regarding Chinese application No. 201410062464.5, dated Jul. 9, 2015. Translation provided by Dragon Intellectual Property Law Firm.
(Continued)

*Primary Examiner* — Tuyen Tra
(74) *Attorney, Agent, or Firm* — Harness, Dickey & Pierce, P.L.C.

(57) ABSTRACT

Disclosed are a slit grating and its manufacturing method, a grating structure and a display device. The slit grating includes a plurality of light-shielding regions and a plurality of light-transmitting regions which are arranged alternately. A photochromic layer, which turns to be in a light-shielding state when it is irradiated by ultraviolet light, is arranged at the light-shielding region. A transparent ultraviolet light-absorbing layer, which is configured to absorb the ultraviolet light, is arranged on the light-transmitting region.

20 Claims, 4 Drawing Sheets

(51) Int. Cl.
  *G02B 27/22* (2006.01)
  *G02B 5/20* (2006.01)
  *G02B 5/23* (2006.01)
(52) U.S. Cl.
  CPC ............... *G02B 5/23* (2013.01); *G02B 27/22* (2013.01); *G02B 27/2214* (2013.01)
(58) Field of Classification Search
  CPC ............... H04N 9/3197; G02B 5/1842; G02B 27/2214; G02B 5/208; G02B 5/23; G02B 5/1866; G02B 27/22; B82Y 20/00
  USPC ............... 359/265–275, 242, 241, 240, 900; 345/105; 252/588, 586
  See application file for complete search history.

(56) References Cited

U.S. PATENT DOCUMENTS

| | | | | |
|---|---|---|---|---|
| 6,811,841 B1 * | 11/2004 | Castiglione | ....... | B32B 17/10018 428/34 |
| 7,859,179 B2 * | 12/2010 | Arakawa | ............. | H05K 9/0096 313/110 |
| 7,982,380 B2 * | 7/2011 | Kamiyama | ............. | G02B 5/02 313/111 |
| 8,164,102 B2 * | 4/2012 | Furukawa | ........... | H01L 25/0753 257/100 |
| 8,609,255 B2 * | 12/2013 | Aoyama | ............... | H01L 31/048 428/213 |
| 2007/0047058 A1 | 3/2007 | Lim | | |
| 2012/0224246 A1 | 9/2012 | Yeh et al. | | |
| 2013/0293824 A1 * | 11/2013 | Yoneyama | ................ | B32B 7/12 349/194 |

FOREIGN PATENT DOCUMENTS

| | | |
|---|---|---|
| CN | 102681193 A | 9/2012 |
| CN | 102902003 A | 1/2013 |
| CN | 102928904 A | 2/2013 |
| CN | 102991049 A | 3/2013 |
| CN | 103076682 A | 5/2013 |
| CN | 103105680 A | 5/2013 |
| CN | 103154776 A | 6/2013 |
| CN | 203705676 U | 7/2014 |

OTHER PUBLICATIONS

Written Opinion of the International Searching Authority for international application No. PCT/CN2014/073622.

* cited by examiner

SLIT GRATING AND ITS MANUFACTURING METHOD, GRATING STRUCTURE AND DISPLAY DEVICE

CROSS-REFERENCE TO RELATED APPLICATION

This application is the U.S. national phase of PCT Application No. PCT/CN2014/073622 filed on Mar. 18, 2014, which claims a priority to Chinese Patent Application No. 201410062464.5 filed on Feb. 24, 2014, the disclosures of which are incorporated in their entirety by reference herein.

TECHNICAL FIELD

The present disclosure relates to the field of three-dimensional display technology, and in particular to a slit grating and its manufacturing method, a grating structure and a display device.

BACKGROUND

At present, a commonly-used display device uses two-dimensional (2D) display, which cannot present depth information of a scene directly. With the development of computer information technology and display technology, three-dimensional (3D) display technology has become a research emphasis in the display field, because it can reconstruct 3D spatial information of the scene exactly, so as to enable viewers to observe a 3D image.

Autostereoscopic display technology refers to that the viewers can observe the three-dimensional image with naked eyes, i.e., without any auxiliary tools. Among numerous three-dimensional display technologies, a grating-type autostereoscopic display technology has been widely applied due to its advantages such as a simple structure, being easy to be achieved and an excellent stereo display effect. There are mainly two types of gratings: a lens grating and a slit grating. The slit grating consists of transparent grating films with dark and bright slits arranged in an array manner, and the lens grating consists of transparent grating plates with a plurality of cylindrical lenses arranged in an array manner. The slit grating is generally used in a three-dimensional display device due to its advantages such as a simple structure, low manufacturing cost, variable grating parameters and absence of focusing problem.

At present, for example, a traditional slit grating is manufactured mostly using an electrically-operated liquid crystal element, and there also exists a light-operated grating which is manufactured using a photochromic material and controlled by switching a light source. As shown in FIG. 1, the light-operated grating in the related art includes a transparent film layer 01 and photochromic bars 02 arranged at intervals on the transparent film layer 01. The photochromic bars 02 are in a transparent state when they are not irradiated by ultraviolet light, so as to achieve the 2D display, as shown in FIG. 1(a); and the photochromic bars 02 turn to be in a light-shielding state when they are irradiated by the ultraviolet light, so as to achieve the 3D display, as shown in FIG. 1(b).

During the 3D display controlled by the light-operated grating with the above structure, the ultraviolet light for achieving the 3D display passes through the slits between the adjacent two photochromic bars and enters eyes of the viewer, which may adversely affect the viewer's healthy.

SUMMARY

An object of the present disclosure is to provide a slit grating, so as to lower or eliminate an adverse influence of ultraviolet light on human eyes during 3D display. Further, the present disclosure provides in embodiments a method for manufacturing the slit grating, a grating structure including the slit grating, and a display device including the grating structure.

The present disclosure provides in embodiments a slit grating, including a plurality of light-shielding regions and a plurality of light-transmitting regions arranged alternately, wherein a photochromic layer, which turns to be in a light-shielding state when it is irradiated by ultraviolet light, is arranged at the light-shielding region, and a transparent ultraviolet light-absorbing layer, which is configured to absorb the ultraviolet light, is arranged at the light-transmitting region.

For the slit grating according to embodiments of the present disclosure, the transparent ultraviolet light-absorbing layer is arranged at the light-transmitting region, and during the 3D display, the ultraviolet light-absorbing layer may absorb the ultraviolet light irradiated to the light-transmitting region. As a result, it is able to avoid the ultraviolet light to the light-transmitting region from entering eyes of a viewer, thereby to protect the eyes of the viewer.

Alternatively, the photochromic layer is arranged at an ultraviolet light-exiting side of the slit grating and covers both the light-shielding region and the light-transmitting region, and the ultraviolet light-absorbing layer is arranged at an ultraviolet light-entering side of the slit grating and covers the light-transmitting region.

Alternatively, the ultraviolet light-absorbing layer is arranged at an ultraviolet light-exiting side of the slit grating and covers both the light-shielding region and the light-transmitting region, and the photochromic layer is arranged at an ultraviolet light-entering side of the slit grating and covers the light-shielding region.

Alternatively, the ultraviolet light-absorbing layer covers the light-transmitting region; and the photochromic layer covers the light-shielding region.

Alternatively, the photochromic layer and the ultraviolet light-absorbing layer are located at opposite sides of a substrate of the slit grating, respectively; or the photochromic layer and the ultraviolet light-absorbing layer are both located at one side of a substrate of the slit grating.

Alternatively, the ultraviolet light-absorbing layer is made of an ultraviolet light-absorbing material selected from a group consisting of diphenyl imidazole, such as pseudogem-bis diphenyl imidazole[2.2]paracyclophane; salicylate, such as phenyl-o-hydroxybenzoate; benzophenone, such as 2,4-dihydroxylbenzophenone, 2-hydroxyl-4-methoxylbenzophenone and 2-hydroxyl-4-n-octoxybenzophenone; benzotriazole, such as 2-(2'-hydroxyl-3',5'-di-t-phenyl)-5-chlorobenzotriazole; substituted acrylonitrile, such as 2-ethylhexyl 2-cyano-3,3'-diphenylacrylate and ethyl 2-cyano-3,3'-diphenylacrylate; triazine, such as 2,4,6-tris(2'-n-butoxyphenyl)-1,3,5-triazine; and hindered amine such as 4-benzoyloxy-2,2,6,6-tetramethylpiperidine and tris(1,2,2,6,6-pentamethyl piperidine)phosphate; or a combination thereof.

Alternatively, the photochromic layer is made of pseudo-gem-bis diphenyl imidazole[2.2]paracyclophane.

The present disclosure further provides in embodiments a grating structure, including the above-mentioned slit grating, and an ultraviolet light source located at an ultraviolet light-entering side of the slit grating.

The present disclosure further provides in embodiments a display device, including a display panel and the above-mentioned grating structure located at a light-exiting side of the display panel.

The present disclosure further provides in embodiments a method for manufacturing a slit grating, the slit grating including a plurality of light-shielding regions and a plurality of light-transmitting regions arranged alternately, the method including:

forming a pattern of a photochromic layer on a substrate, wherein the pattern of the photochromic layer is configured to cover the light-shielding region of the slit grating, and the photochromic layer turns to be in a light-shielding state when it is irradiated by ultraviolet light; and forming a transparent ultraviolet light-absorbing layer, which is configured to absorb the ultraviolet light and covers both the light-shielding region and the light-transmitting region, on the pattern of the photochromic layer.

The present disclosure further provides in embodiments a method for manufacturing a slit grating, the slit grating including a plurality of light-shielding regions and a plurality light-transmitting regions arranged alternately, the method including:

forming a pattern of a transparent ultraviolet light-absorbing layer, which is configured to absorb ultraviolet light, on a substrate, wherein the pattern of the transparent ultraviolet light-absorbing layer is configured to cover the light-transmitting region of the slit grating; and forming a photochromic layer, which covers both the light-shielding region and the light-transmitting region, on the pattern of the ultraviolet light-absorbing layer, wherein the photochromic layer covering the light-shielding region turns to be in a light-shielding state when it is irradiated by the ultraviolet light.

DETAILED DESCRIPTION

Figure 1:
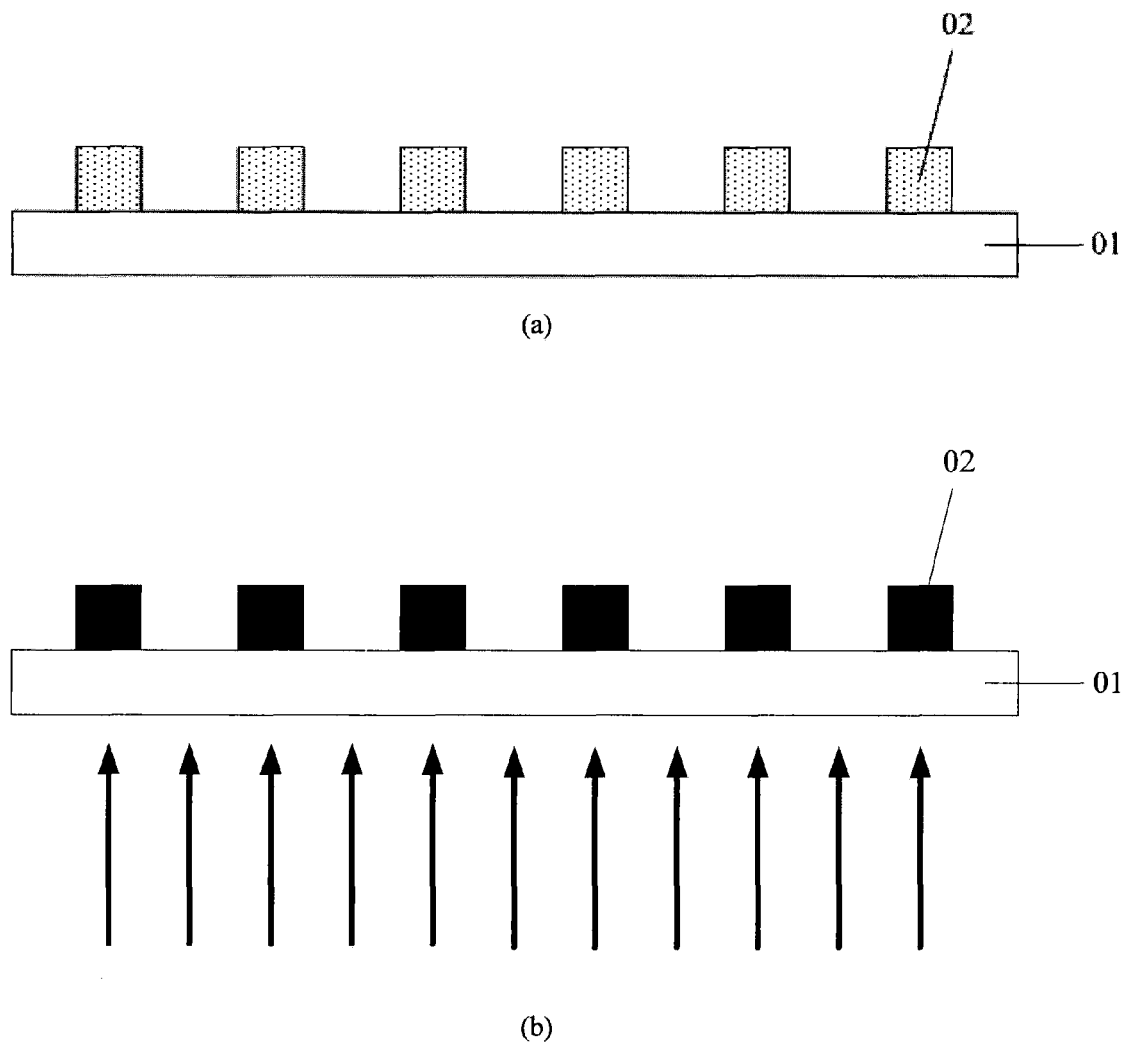
FIG. 1 is a schematic view showing a light-operated grating (a) when it is not irradiated by ultraviolet light and (b) when it is irradiated by ultraviolet light in the related art.

A slit grating and its manufacturing method, a grating structure and a display device of the disclosure will be described hereinafter in details in conjunction with the drawings and the embodiments.

A thickness, a size and a shape of each film layer in the drawings are for illustrative purposes only, but shall not be used to reflect a real scale of the slit grating.

As shown in FIGS. 2 to 6, a slit grating according to embodiments of the present disclosure includes a plurality of light-shielding regions A and a plurality of light-transmitting regions B, which are arranged alternately. The photochromic layer 100, which turns to be in a light-shielding state when it is irradiated by ultraviolet light, is arranged at the light-shielding region A. The transparent ultraviolet light-absorbing layer 200, which is configured to absorb the ultraviolet light, is arranged at the light-transmitting region B.

For the slit grating according to embodiments of the present disclosure, the transparent ultraviolet light-absorbing layer is arranged at the light-transmitting region, and during 3D display, to the ultraviolet light-absorbing layer may absorb the ultraviolet light irradiated to the light-transmitting region. As a result, it is able to avoid the ultraviolet light to the light-transmitting region from entering eyes of a viewer, thereby to protect the eyes of the viewer.

It should be noted that, in the slit grating according to embodiments of the present disclosure, the photochromic layer, configured to cover the light-shielding region, is in a light-shielding state when it is irradiated by the ultraviolet light, so as to achieve 3D display; and the photochromic layer, configured to cover the light-shielding region, is in a light-transmitting state when it is not irradiated by the ultraviolet light, so as to achieve 2D display.

Specifically, the ultraviolet light-absorbing layer may be made of an ultraviolet light-absorbing material selected from a group consisting of diphenyl imidazole, such as pseudo-gem-bis diphenyl imidazole[2.2]paracyclophane; salicylate, such as phenyl-o-hydroxybenzoate; benzophenone, such as 2,4-dihydroxylbenzophenone, 2-hydroxyl-4-methoxylbenzophenone and 2-hydroxyl-4-n-octoxybenzophenone; benzotriazole, such as 2-(2'-hydroxyl-3',5'-di-t-phenyl)-5-chlorobenzotriazole; substituted acrylonitrile, such as 2-ethylhexyl 2-cyano-3,3'-diphenylacrylate and ethyl 2-cyano-3,3'-diphenylacrylate; triazine, such as 2,4,6-tris(2'-n-butoxyphenyl)-1,3,5-triazine; and hindered amine such as 4-benzoyloxy-2,2,6,6-tetramethylpiperidine and tris(1,2,2,6,6-pentamethyl piperidine)phosphate; or a combination thereof. Of course, the ultraviolet light-absorbing layer may be made of any other materials, as long as they may be used to achieve the object of the present disclosure.

Alternatively, the photochromic layer may be made of pseudogem-bis diphenyl imidazole[2.2]paracyclophane, or a combination of pseudogem-bis diphenyl imidazole[2.2]paracyclophane and other ultraviolet light absorbents.

Figure 6:
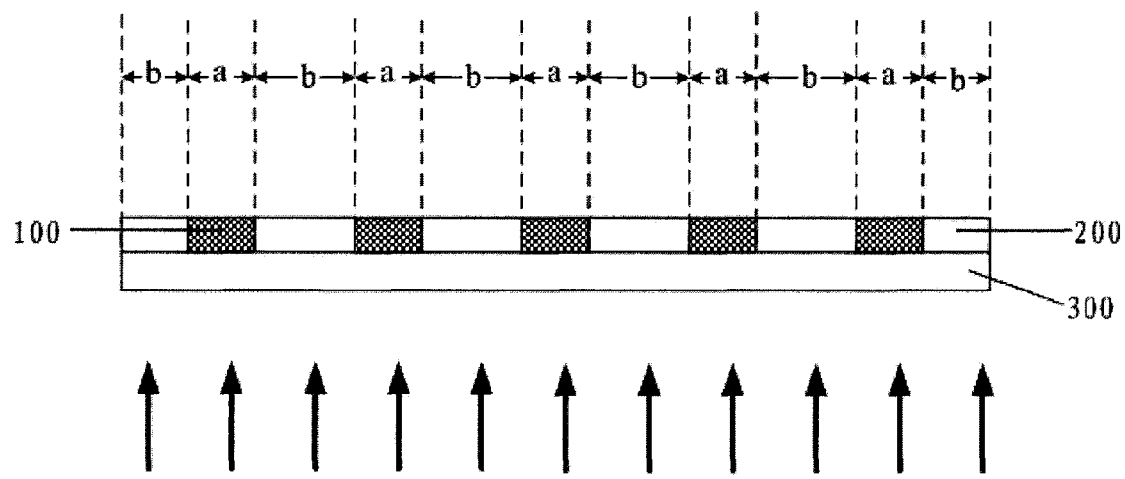
FIG. 6 is still yet another schematic view showing the slit grating according to an embodiment of the present disclosure.

Further, as shown in FIG. 6, the photochromic layer 100 may only cover the light-shielding region A, and the ultraviolet light-absorbing layer 200 may only cover the light-transmitting region B. When there is no ultraviolet light, the photochromic layer 100 covering the light-shielding region A and the ultraviolet light-absorbing layer 200 covering the light-transmitting region B are both in the light-transmitting state, so as to achieve the 2D display; when there is the ultraviolet light, the photochromic layer 100 covering the light-shielding region A turns to be in the light-shielding state, while the ultraviolet light-absorbing layer 200 covering the light-transmitting region B is still in the light-transmitting state, so as to achieve the 3D display.

During the manufacture of the slit grating having the above structure, the photochromic layer 100 is formed through one mask process, and the ultraviolet light-absorbing layer 200 is formed through another mask process; i.e., such slit grating is manufactured through two mask processes.

Further, the photochromic layer and the ultraviolet light-absorbing layer may be located at opposite sides of a substrate of the slit grating, respectively; or, the photochromic layer 100 and the ultraviolet light-absorbing layer 200 may be both located at one side of a substrate 300 of the slit grating as shown in FIG. 6, i.e., the their positions are not particularly defined herein.

Figure 2:
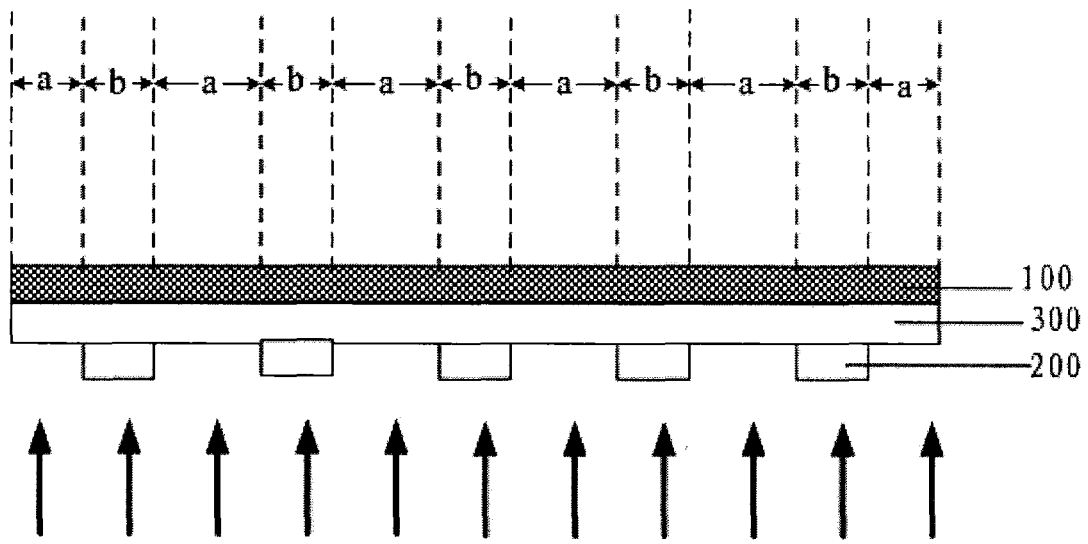
FIG. 2 is a schematic view showing a slit grating according to an embodiment of the present disclosure.
Figure 3:
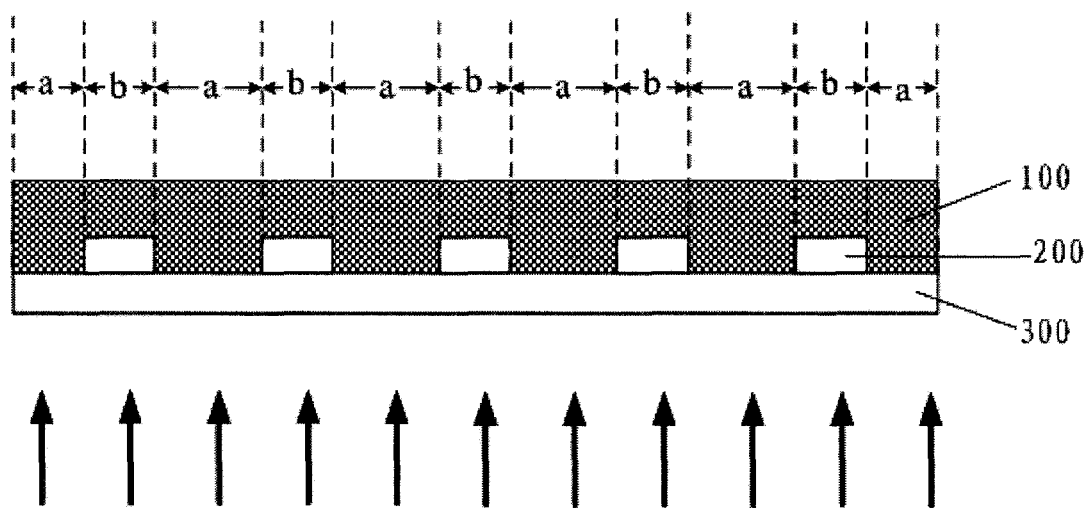
FIG. 3 is an another schematic view showing the slit grating according to an embodiment of the present disclosure.

Alternatively, in order to reduce the number of the mask processes, as shown in FIGS. 2 and 3, the photochromic layer 100 may be arranged at an ultraviolet light-exiting side of the slit grating and cover both the light-shielding region A and the light-transmitting region B, and the ultraviolet light-absorbing layer 200 may be arranged at an ultraviolet light-entering side of the slit grating and only cover the light-transmitting region B. Accordingly, during the specific manufacture of the slit grating, as being of a whole-layer structure, the photochromic layer 100 is manufactured without a mask process, while only the ultraviolet light-absorbing layer 200 is manufactured through a mask process, i.e., the slit grating is manufactured through only one mask process. Thus, as compared with the structure of the slit grating shown in FIG. 6, the slit grating structure shown in FIGS. 2 and 3 may be manufactured through only one mask process, so as to simplify the manufacturing process and lower production cost.

Further, as shown in FIG. 2, the photochromic layer 100 and the ultraviolet light-absorbing layer 200 may be located at opposite sides of the substrate 300 of the slit grating, respectively; or the photochromic layer 100 and the ultraviolet light-absorbing layer 200 may be both located at one side of the substrate 300 of the slit grating as shown in FIG. 3, i.e., their positions are not particularly defined herein.

Figure 4:
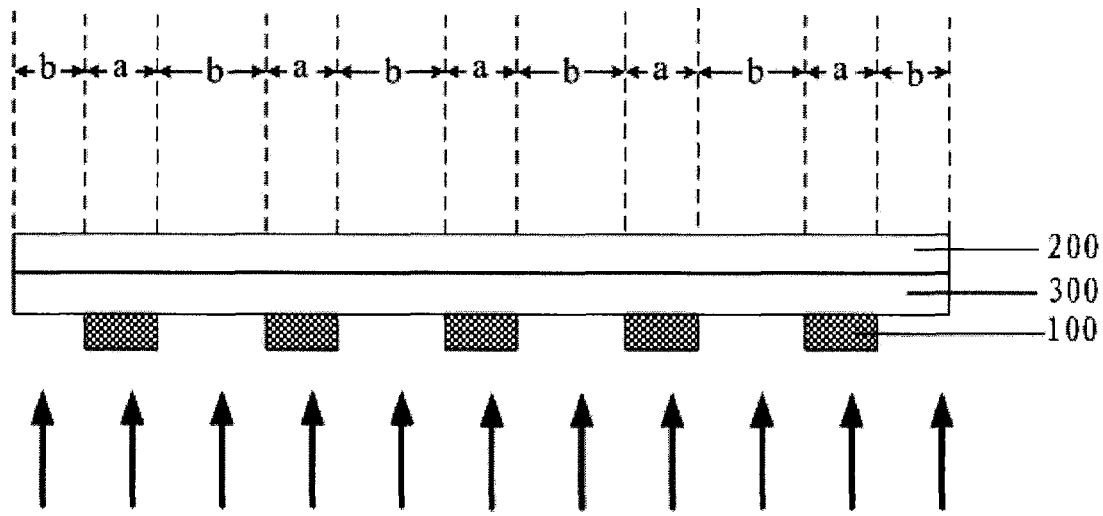
FIG. 4 is yet another schematic view showing the slit grating according to an embodiment of the present disclosure.
Figure 5:
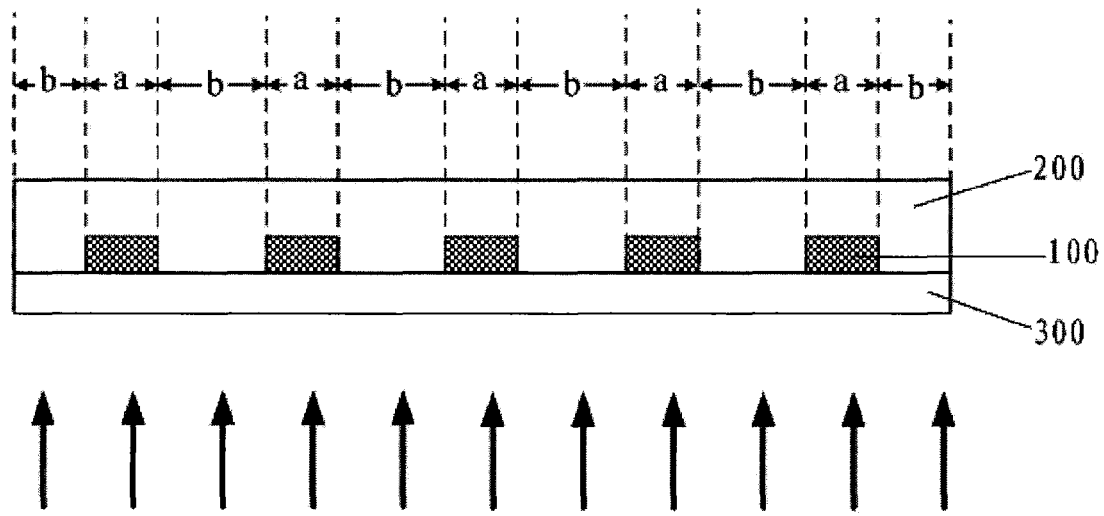
FIG. 5 is still yet another schematic view showing the slit grating according to an embodiment of the present disclosure.

Alternatively, in order to reduce the number of the mask processes, as shown in FIGS. 4 and 5, the ultraviolet light-absorbing layer 200 is arranged at an ultraviolet light-exiting side of the slit grating and covers both the light-shielding region A and the light-transmitting region B, and the photochromic layer 100 is arranged at an ultraviolet light-entering side of the slit grating and only covers the light-shielding region B. Accordingly, during the specific manufacture of the slit grating, as being a whole-layer structure, the ultraviolet light-absorbing layer 200 is manufactured without a mask process while only the photochromic layer 100 is manufactured through a mask process, i.e., the slit grating is manufactured through only one mask process. Therefore, as compared with the slit grating having the structure shown in FIG. 6, the slit grating shown in FIGS. 4 and 5 is manufactured through only one mask process, so as to simplify the manufacturing process and lower production cost.

Further, as shown in FIG. 4, the photochromic layer 100 and the ultraviolet light-absorbing layer 200 may be located at opposite sides of the substrate 300 of the slit grating, respectively; or the photochromic layer 100 and the ultraviolet light-absorbing layer 200 may be both located at one side of the substrate 300 of the slit grating as shown in FIG. 5, i.e., their positions are not particularly herein.

Figure 7:
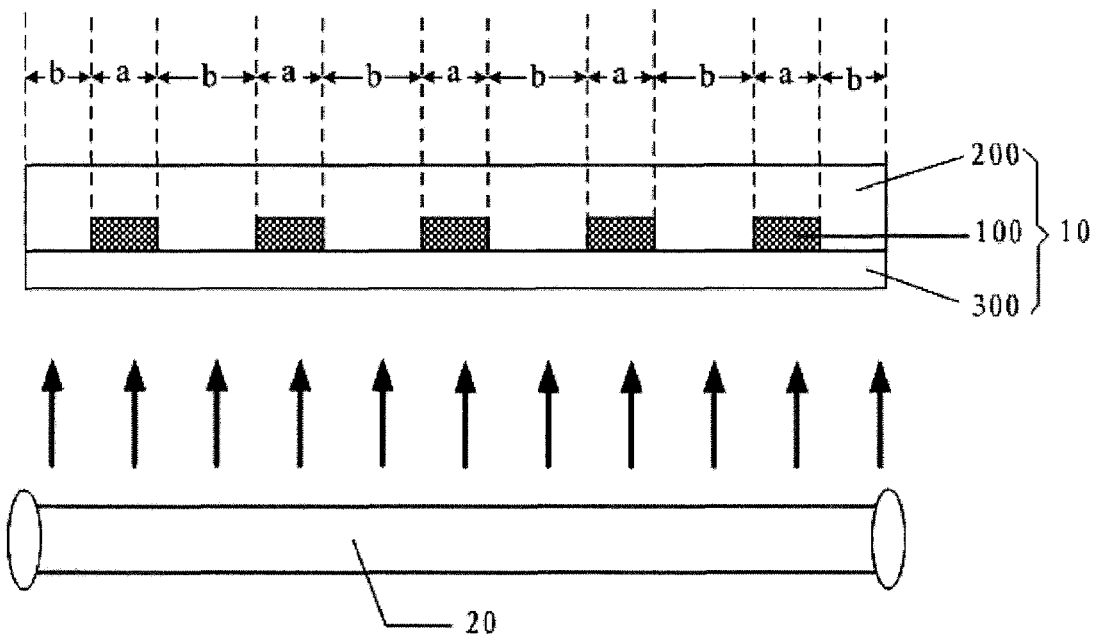
FIG. 7 is a schematic view showing a grating structure according to an embodiment of the present disclosure.

Based on the same inventive concept, the present disclosure further provides in embodiments a grating structure, as shown in FIG. 7. The grating structure includes the above-mentioned slit grating 10, and the ultraviolet light source 20 which is located at an ultraviolet light-entering side of the slit grating 10. The grating structure is based on a principle for achieving the object similar to the above-mentioned slit grating, so the implementation of the grating structure may refer to that mentioned above and thus will not be repeated herein.

Based on the same inventive concept, the present disclosure further provides in embodiments a display device, which includes a display panel and the above-mentioned grating structure, which is located at a light-exiting side of the display panel. The display panel may be an electronic book, a plasma display panel, a liquid crystal display panel, an organic light-emitting diode display panel, etc. The display device is based on a principle for achieving the object similar to the above-mentioned grating structure, so the implementation of the display device may refer to that mentioned above and thus will not be repeated herein. The display device may be any product or member having a display function, for example, a mobile phone, a flat-panel PC, a TV, a display, a laptop PC, a digital photo frame or a navigator. The implementation of the display device may refer to the above embodiments and thus will not be repeated herein.

Based on the same inventive concept, the present disclosure further provides in embodiments a method for manufacturing a slit grating, which includes a plurality of light-shielding regions and a plurality of light-transmitting regions arranged alternately. The method may include the steps of:

Step 11): forming a pattern of a photochromic layer on a substrate, wherein the pattern of the photochromic layer is configured to cover the light-shielding region of the slit grating, and the photochromic layer turns to be in a light-shielding state when it is irradiated by ultraviolet light; and Step 12): forming a transparent ultraviolet light-absorbing layer, which is configured to absorb the ultraviolet light and covers both the light-shielding region and the light-transmitting region, on the pattern of the photochromic layer.

During specific implementation of Step 11), a film layer made of a photochromic material may be firstly deposited on the substrate, and then the pattern of the photochromic layer covering the light-shielding region may be formed in the film layer made of photochromic material by a patterning process.

For the method for manufacturing the slit grating according to above embodiments of the present disclosure, the transparent ultraviolet light-absorbing layer is arranged at the light-transmitting region, and during 3D display, the ultraviolet light-absorbing layer may absorb the ultraviolet light irradiated to the light-transmitting region, so it is able to avoid the ultraviolet light to the light-transmitting region from entering eyes of a viewer, thereby to protect the eyes of the viewer. In addition, according to the manufacturing method, the photochromic layer is manufactured through only one mask process, so it is able to simplify the manufacturing process, and lower the production cost.

Based on the same inventive concept, the disclosure further provides in embodiments a method for manufacturing a slit grating, wherein the slit grating includes a plurality of light-shielding regions and a plurality of light-transmitting regions arranged alternately. The method may include the steps of:

Step 21): forming a pattern of a transparent ultraviolet light-absorbing layer, which is configured to absorb ultraviolet light, on a substrate, wherein the pattern of the transparent ultraviolet light-absorbing layer is configured to cover the light-transmitting region of the slit grating; and Step 22): forming a photochromic layer, which covers both the light-shielding region and the light-transmitting region, on the pattern of the ultraviolet light-absorbing layer, wherein the photochromic layer covering the light-shielding region turns to be in a light-shielding state when it is irradiated by the ultraviolet light.

During specific implementation of Step 21), a film layer made of a transparent ultraviolet light-absorbing material may be firstly deposited on the substrate, and then the pattern of the ultraviolet light-absorbing layer covering the light-transmitting region may be formed in the film layer made of the transparent ultraviolet light absorbing material by a patterning process.

For the method for manufacturing the slit grating according to above embodiments of the present disclosure, the transparent ultraviolet light-absorbing layer is arranged at the light-transmitting region, and during 3D display, the transparent ultraviolet light-absorbing layer may absorb the ultraviolet light irradiated to the light-transmitting region, so it is able to avoid the ultraviolet light irradiated to the light-transmitting region from entering eyes of a viewer, thereby to protect the eyes of the viewer. In addition, according to the manufacturing method, the photochromic layer is manufactured through only one mask process, so it is able to simplify the manufacturing process, and lower the production cost.

The present disclosure provides in embodiments the slit grating and its manufacturing method, the grating structure and the display device. The slit grating includes a plurality of light-shielding regions and a plurality of light-transmitting regions arranged alternately. The photochromic layer, which turns to be in the light-shielding state when it is irradiated by the ultraviolet light, is arranged on the light-shielding region. The transparent ultraviolet light-absorbing layer, which is configured to absorb the ultraviolet light, is arranged at the light-transmitting region. For the slit grating according to embodiments of the present disclosure, the transparent ultraviolet light-absorbing layer is arranged at the light-transmitting region, and during 3D display, the transparent ultraviolet light-absorbing layer may absorb the ultraviolet light irradiated to the light-transmitting region, so it is able to avoid the ultraviolet light irradiated to the light-transmitting region from entering eyes of a viewer, thereby to protect the eyes of the viewer.

The above are merely the preferred embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. A slit grating, comprising a plurality of light-shielding regions and a plurality of light-transmitting regions arranged alternately,
    wherein a photochromic layer, which turns to be in a light-shielding state when it is irradiated by ultraviolet light, is arranged at the light-shielding region,
    a transparent ultraviolet light-absorbing layer, configured to absorb the ultraviolet light, is arranged at the light-transmitting region, and
    the photochromic layer is made of pseudogem-bis diphenyl imidazole [2.2] paracyclophane.

2. The slit grating according to claim 1, wherein the photochromic layer is arranged at an ultraviolet light-exiting side of the slit grating and covers both the light-shielding region and the light-transmitting region, and the ultraviolet light-absorbing layer is arranged at an ultraviolet light-entering side of the slit grating and covers the light-transmitting region.

3. The slit grating according to claim 2, wherein
    the photochromic layer and the ultraviolet light-absorbing layer are located at opposite sides of a substrate of the slit grating, respectively; or
    the photochromic layer and the ultraviolet light-absorbing layer are both located at one side of a substrate of the slit grating.

4. The slit grating according to claim 1, wherein the ultraviolet light-absorbing layer is arranged at an ultraviolet light-exiting side of the slit grating and covers both the light-shielding region and the light-transmitting region, and the photochromic layer is arranged at an ultraviolet light-entering side of the slit grating and covers the light-shielding region.

5. The slit grating according to claim 4, wherein
    the photochromic layer and the ultraviolet light-absorbing layer are located at opposite sides of a substrate of the slit grating, respectively; or
    the photochromic layer and the ultraviolet light-absorbing layer are both located at one side of a substrate of the slit grating.

6. The slit grating according to claim 1, wherein the ultraviolet light-absorbing layer covers the light-transmitting region; and the photochromic layer covers the light-shielding region.

7. The slit grating according to claim 6, wherein
    the photochromic layer and the ultraviolet light-absorbing layer are located at opposite sides of a substrate of the slit grating, respectively; or
    the photochromic layer and the ultraviolet light-absorbing layer are both located at one side of a substrate of the slit grating.

8. The slit grating according to claim 1, wherein
    the photochromic layer and the ultraviolet light-absorbing layer are located at opposite sides of a substrate of the slit grating, respectively; or
    the photochromic layer and the ultraviolet light-absorbing layer are both located at one side of a substrate of the slit grating.

9. A grating structure, comprising:
    the slit grating according to claim 1; and
    an ultraviolet light source, located at an ultraviolet light-entering side of the slit grating.

10. A display device, comprising:
    a display panel; and
    the grating structure according to claim 9, located at a light-exiting side of the display panel.

11. The slit grating according to claim 1, wherein the ultraviolet light-absorbing layer is made of imidazole, salicylate, benzophenone, benzotriazole, substituted acrylonitrile, triazine, hindered amine, or a combination thereof.

12. A method for manufacturing a slit grating, the slit grating comprising a plurality of light-shielding regions and a plurality of light-transmitting regions arranged alternately, the method comprising:
    forming a pattern of a photochromic layer on a substrate, wherein the pattern of the photochromic layer is configured to cover the light-shielding region of the slit grating, and the photochromic layer turns to be in a light-shielding state when it is irradiated by ultraviolet light; and
    forming a transparent ultraviolet light-absorbing layer, which is configured to absorb the ultraviolet light and covers both the light-shielding region and the light-transmitting region, on the pattern of the photochromic layer, wherein the photochromic layer is made of pseudogem-bis diphenyl imidazole [2.2] paracyclophane.

13. The slit grating according to claim 12, wherein the ultraviolet light-absorbing layer is made of imidazole, salicylate, benzophenone, benzotriazole, substituted acrylonitrile, triazine, hindered amine, or a combination thereof.

14. The method according to claim 12, wherein the photochromic layer is arranged at an ultraviolet light-exiting side of the slit grating and covers both the light-shielding region and the light-transmitting region, and the ultraviolet light-absorbing layer is arranged at an ultraviolet light-entering side of the slit grating and covers the light-transmitting region.

15. The method according to claim 12, wherein the ultraviolet light-absorbing layer is arranged at an ultraviolet light-exiting side of the slit grating and covers both the light-shielding region and the light-transmitting region, and the photochromic layer is arranged at an ultraviolet light-entering side of the slit grating and covers the light-shielding region.

16. The method according to claim 12, wherein the ultraviolet light-absorbing layer covers the light-transmitting region; and the photochromic layer covers the light-shielding region.

17. A method for manufacturing a slit grating, the slit grating comprising a plurality of light-shielding regions and a plurality of light-transmitting regions arranged alternately, the method comprising:

forming a pattern of a transparent ultraviolet light-absorbing layer, which is configured to absorb ultraviolet light, on a substrate, wherein the pattern of the ultraviolet light-absorbing layer is configured to cover the light-transmitting region of the slit grating; and forming a photochromic layer, which covers both the light-shielding region and the light-transmitting region, on the pattern of the ultraviolet light-absorbing layer, wherein the photochromic layer covering the light-shielding region turns to be in a light-shielding state when it is irradiated by the ultraviolet light, wherein the photochromic layer is made of pseudogem-bis diphenyl imidazole [2.2] paracyclophane.

18. The slit grating according to claim 17, wherein the ultraviolet light-absorbing layer is made of imidazole, salicylate, benzophenone, benzotriazole, substituted acrylonitrile, triazine, hindered amine, or a combination thereof.

19. The method according to claim 17, wherein the photochromic layer is arranged at an ultraviolet light-exiting side of the slit grating and covers both the light-shielding region and the light-transmitting region, and the ultraviolet light-absorbing layer is arranged at an ultraviolet light-entering side of the slit grating and covers the light-transmitting region.

20. The method according to claim 17, wherein the ultraviolet light-absorbing layer covers the light-transmitting region; and the photochromic layer covers the light-shielding region.

* * * * *